O. G. RIESKE.
FEATHER PICKING MACHINE.
APPLICATION FILED NOV. 29, 1915.
1,230,222.
Patented June 19, 1917.
2 SHEETS—SHEET 1.
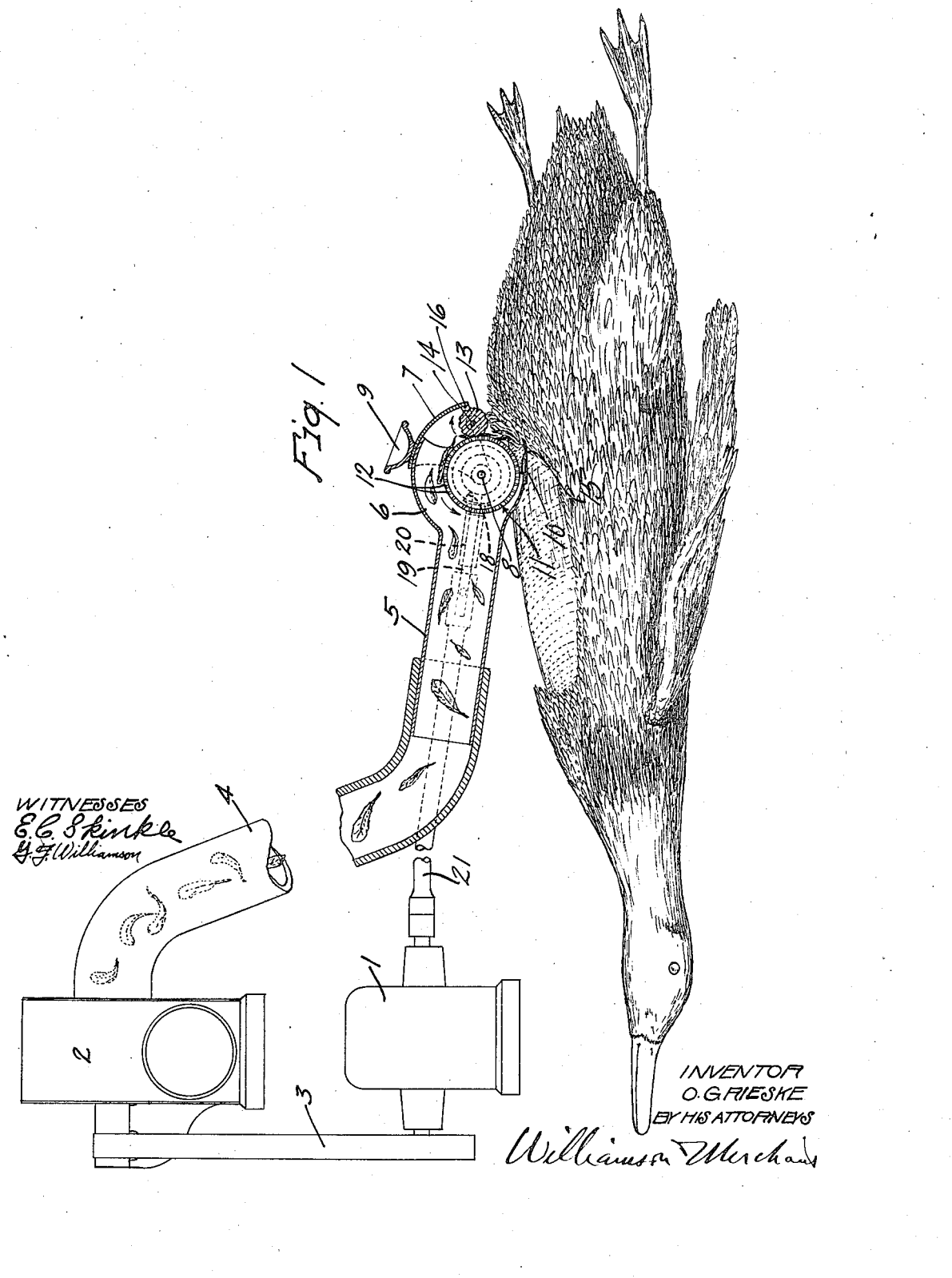

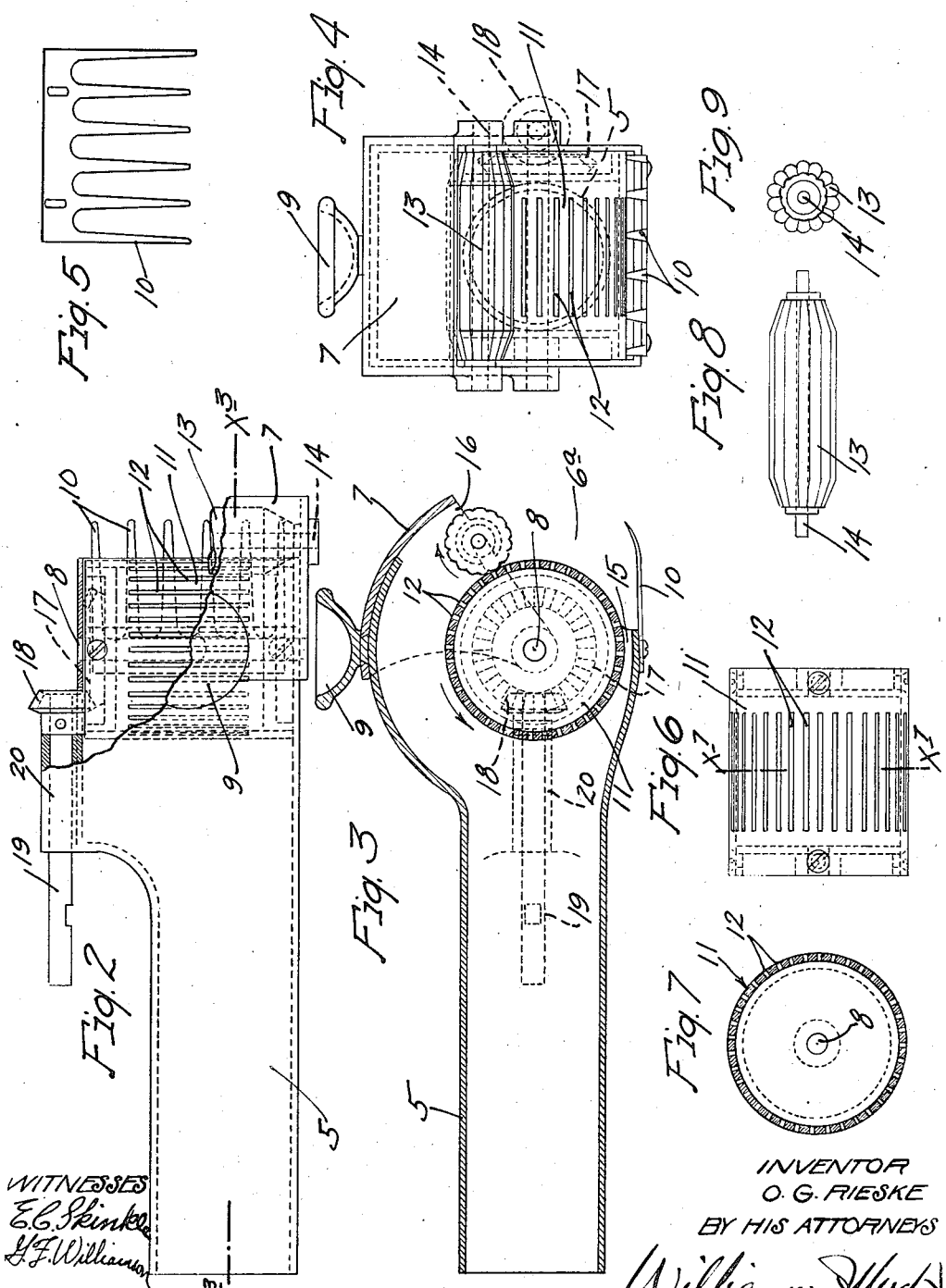

UNITED STATES PATENT OFFICE.

OTTO G. RIESKE, OF TORONTO, ONTARIO, CANADA.

FEATHER-PICKING MACHINE.

1,230,222.  Specification of Letters Patent.  Patented June 19, 1917.

Application filed November 29, 1915. Serial No. 64,102.

*To all whom it may concern:*

Be it known that I, OTTO G. RIESKE, a citizen of the United States, residing at Toronto, in the Province of Ontario, Canada, have invented certain new and useful Improvements in Feather-Picking Machines; and I do hereby declare the following to be a full, clear, and exact description of the invention, such as will enable others skilled in the art to which it appertains to make and use the same.

My invention has for its object to provide an extremely simple and highly efficient feather picking machine adapted for use to pick the feathers from fowls; and to such ends, generally stated, the invention consists of the novel devices and combinations of devices hereinafter described and defined in the claims.

The following are well known facts: That fowls that are dry picked, bring better prices on the market than those that are picked wet. That the picking of fowls and especially of wild game birds, is very laborious, and hence, costly in time and money. That the down feathers of certain fowls, especially ducks and geese, are valuable when properly picked and saved. That in the dry picking of fowls, great care must be taken to prevent tearing of the skin, so that prime dressed fowls must not only be dry picked but must be picked with great care.

My invention provides a machine that will dry pick feathers from wild game and other fowl very rapidly, at a resulting small cost, and furthermore, that will pick feathers clean from the fowl without tearing or breaking the skin. Thus, I eliminate slow and costly hand operations and do, rapidly, a better grade of work than can be done by hand within reasonable time limits.

This feather picking machine I consider broadly new, and hence, capable of taking many forms within the scope of my invention.

In the accompanying drawings which illustrate the invention I have illustrated a machine which I have actually used and found efficient for the purposes in view. In the said drawings, like characters indicate like parts throughout the several views.

Referring to the drawings:

Figure 1 is a view partly in side elevation and partly in section, showing the improved picking machine and illustrating the action thereof in picking the feathers from a duck;

Fig. 2 is a plan view of the picking device proper, some parts being broken away and some parts being sectioned;

Fig. 3 is a section taken on the line $x^3$ $x^3$ of Fig. 2;

Fig. 4 is a front end elevation of the parts shown in Figs. 2 and 3;

Fig. 5 is a plan view of the comb which constitutes a feature of the invention;

Fig. 6 is a plan view of the main picking roller showing the same removed from the machine;

Fig. 7 is a section on the line $x^7$ $x^7$ of Fig. 6;

Fig. 8 is a plan view of the so-called auxiliary picking roller; and

Fig. 9 is an end elevation of the said auxiliary roller.

In Fig. 1, the numeral 1 indicates an electric motor, which will preferably be used as a source of motive power. The numeral 2 indicates a suction fan which is driven from the motor 1 through a belt 3 and coöperating pulleys. The said motor and fan are local or stationary. The receiving eye of the fan 2 is connected by a large size flexible suction tube 4, to the tubular stem 5 of a casing 6, which casing has a segmental wall that is closely engaged by a segmental hood 7 shown as pivotally connected to the said casing by a transverse shaft 8. The hood 7 is shown as provided with a finger piece 9 by means of which it may be readily moved and held in different positions, so that the said hood may be used to open and close, more or less, the mouth $6^a$ of the casing. At its lower edge, or at that edge of the mouth 6 that is opposite to the hood 7, the casing 6 is provided with a comb 10, preferably of metal, and which comb projects, as best shown in Fig. 3, so that it is adapted to be pressed against the skin of the fowl and run between the feathers in the feather picking action. Located in the casing 6 and projecting from the mouth thereof, is a main picking roller 11 in the form of a cylinder having closed ends and peripheral slits or air passages 12.

Working in frictional contact with the main roller 11 is an auxiliary picking roller 13 preferably rubber faced and corrugated with ends tapered. The shaft 14 of this auxiliary roller is journaled in the sides of the hood 7 so that it partakes of the oscillatory movements of the said hood, but will always be frictionally driven by the said main roller. Here it may be noted that there is a free air pasage 15 between the periphery of the main roller 11 and the adjacent wall or bottom of the casing 6 and that there is a similar free air passage 16 between the periphery of the auxiliary roller 13 and the lower edge of the hood 7. The important reasons for these air passages 15 and 16 will be noted in the description of the operation.

One end of the shaft 8 to which the main roller 11 is secured, projects through the casing 6 and is provided with a beveled gear 17 that meshes with a beveled pinion 18 on the front end of a short shaft 19 journaled in a suitable bearing 20 on the casing 6. This shaft 19 is connected to the armature shaft of the motor 1 through a flexible driving shaft 21 of any suitable or well known construction.

When the motor 1 is in action, the primary picking wheel 11 will be positively rotated in the direction of the arrow marked adjacent thereto on Fig. 3, and the auxiliary roller will also be rotated by its frictional contact with the said main roller, and at the same time, the suction fan 2 will be thrown into action and will produce a partial vacuum or strong suction in the tubes of the pneumatic conveyer, including the flexible pipe 4, tube 5 and casing 6, the air being drawn in, of course, through the mouth 6ª of the casing. To pick the feathers, the comb 10 is run under the feathers against the skin of the bird and the casing should be held approximately as shown in Fig. 1, with the hood against the skin low down, so as to bring the coöperating picking rollers 11 and 13 directly into action upon the down or feathers. The teeth of the comb will hold the skin down to prevent the same from being torn, and the coöperating rollers will pull the down and feathers and carry the same upward between them and into the casing. The suction or partial vacuum produced in the casing will also be produced in the interior of the perforated main picking roller so that considerable of the air will be drawn through the roller and this will cause the feathers to tightly hug the periphery of the said main rollers until they are carried upward into the casing, whereupon they will be relieved from pressure drawn into the roller and will be carried by the air through the tubes 4 and 5 and fan casing and out through the discharge tube of the fan, from whence they may be delivered to any suitable receptacle. The air passages 15 and 16 permit quite a strong draft of air to be drawn inward through the same and thereby, with certainty, picking from the peripheral surface of the outwardly moving portions of the rollers 11 and 13, all feathers that may tend to adhere thereto. These air passages are therefore, highly important.

The tube 5 of the casing affords a convenient hand piece for holding the device in working position, and when thus held, the thumb may be placed on the knob 9 and the hood and auxiliary roller thereby adjusted to the proper closeness to the feathers.

The feather picking machine described can be made and operated at very small cost and it will not only rapidly pick feathers from a bird or fowl, but will do high grade work without damaging either the feathers or the skin of the bird. It is, therefore, a highly important labor saving device.

The machine, while especially designed for use for picking feathers from fowls, is, as is obvious, capable of general use for picking fluffy material, such as feathers, hair, or fur, from skins, or the like.

What I claim is:

1. A picking machine comprising a case provided with a mouth opening, means for producing a partial vacuum in said case, and a picking means including a movable element having an internal cavity and peripheral air passages leading thereto, which peripheral passages are movable from the exterior to the interior of said case whereby the feathers, or the like, will be drawn against the exterior portion of the said movable member and will be drawn off from that portion thereof that is within said case.

2. A portable picking machine comprising a case provided with a mouth opening and having a part adapting it to be held and carried in the hand, power driven picking means within said case adjacent to the mouth opening thereof, a stationary power device and suction fan, a flexible conveyer tube connecting the intake of said fan to said portable case, and a flexible driving shaft connecting said power device to the power driven picking means of said case.

3. In a feather picking machine, the combination with a casing having an open mouth, of a hood movably mounted on said casing for varying the size of the said mouth and coöperating main and auxiliary picking rollers working in the mouth of said casing, the former being journaled to the said casing and the latter to the adjustable hood thereof.

4. In a feather picking machine, the combination with a casing having an open mouth, of a hood movably mounted on said casing for varying the size of the said mouth, coöperating main and auxiliary picking rollers working in the mouth of said casing, the former being journaled to the said casing and the latter to the adjustable hood thereof, and a comb applied to said casing and projecting beyond that part of the mouth thereof that is opposite the said hood.

5. In a feather picking machine, the combination with a casing having an open mouth, of a hood movably mounted on said casing for varying the size of the said mouth, coöperating main and auxiliary picking rollers working in the mouth of said casing, the former being journaled to the said casing and the latter to the adjustable hood thereof, and a pneumatic conveyer having a suction tube connected to said casing.

6. In a feather picking machine, the combination with a casing having an open mouth, of a hood movably mounted on said casing for varying the size of the said mouth and coöperating main and auxiliary picking rollers working in the mouth of said casing, the former being journaled to the said casing and the latter to the adjustable hood thereof, a comb applied to said casing and projecting beyond that part of the mouth thereof that is opposite the said hood, and a pneumatic conveyer having a suction tube connected to said casing.

7. A feather picking machine comprising a casing with an open mouth and coöperating picking rollers working in the mouth of said casing, a pneumatic conveyer having a suction tube connected to said casing, the said casing having free air passages immediately adjacent to the peripheral portions of the said picking rollers, whereby feathers adhering to the outwardly moving surface of said rollers will be drawn into the said casing.

8. In a feather picking machine, the combination with a casing having an open mouth, of a hood movably mounted on said casing for varying the size of the said mouth, coöperating main and auxiliary picking rollers working in the mouth of said casing, the former being journaled to the said casing and the latter to the adjustable hood thereof, and a pneumatic conveyer having a suction tube connected to said casing, the said casing and hood having free air passages immediately adjacent to the peripheral portions of the coöperating picking rollers, whereby feathers that adhere to outwardly moving surfaces of said rollers will be drawn into said casing.

9. A feather picking machine comprising a casing with an open mouth, coöperating picking rollers working in the mouth of said casing, one of the said rollers being in the form of a hollow cylinder having peripheral air passages, and a pneumatic conveyer having a suction tube connected to said casing.

10. A feather picking machine comprising a casing with an open mouth, coöperating picking rollers working in the mouth of said casing, one of the said rollers being in the form of a hollow cylinder having peripheral air passages, and a pneumatic conveyer having a suction tube connected to said casing, the said casing having free air passages adjacent to the peripheral portions of said rollers.

11. In a feather picking machine, the combination with a casing having an open mouth, of an adjustable hood for varying the size of said mouth, coöperating main and auxiliary picking rollers working in the mouth of said casing, the former being journaled to said casing and the latter to the adjustable hood thereof, one of the said rollers being in the form of a hollow cylinder having peripheral air passages, power driven connections for directly driving one of said rollers, and a pneumatic conveyer having a suction tube connected to said casing.

12. In a feather picking machine, the combination with a casing having an open mouth, of an adjustable hood for varying the size of said mouth, coöperating main and auxiliary picking rollers working in the mouth of said casing, the former being journaled to said casing and the latter to the adjustable hood thereof, one of the said rollers being in the form of a hollow cylinder having peripheral air passages, power driven connections for directly driving one of said rollers, a pneumatic conveyer having a suction tube connected to said casing, and a comb secured to said casing and projecting beyond that portion of the mouth thereof that is opposite to said adjustable hood, the said casing and hood having free air passages adjacent to the outer peripheral portions of said rollers.

13. A feather picking device comprising a casing having a mouth opening, a hollow picking roller working in said mouth opening and having peripheral air passages extended therethrough, means for rotating said roller in a constant direction, and means for producing partial vacuum within said casing.

14. A feather picking device comprising a casing having a mouth opening, a cylindrical picking roller working in said mouth opening and having peripheral air passages extended therethrough movable from the exposed side of the mouth opening into the interior of said casing, and means for producing a partial vacuum within said casing whereby the feathers will be caused, first to adhere to said roller and then to be removed therefrom at the interior of the casing.

15. A feather picking device comprising a casing having a mouth opening, a cylindrical picking roller working in said mouth opening and having peripheral air passages extended therethrough and movable from the exposed side of the mouth opening into the interior of said casing, means for producing a partial vacuum within said casing whereby the feathers will be caused, first to adhere to said roller and then to be removed therefrom at the interior of the casing, and a roller coöperating with said cylindrical roller in the feather pulling action, the said two rollers substantially closing said mouth opening.

16. A picking device comprising a case having a mouth opening, picking means including a picking roller working in said mouth opening and having air passages extended therethrough from one peripheral point to another, means for rotating said roller, and means for producing partial vacuum within said case, whereby the feathers, or the like, will be drawn against the exposed exterior portion of said roller and will be drawn off from that portion thereof that is within said case.

In testimony whereof I affix my signature in presence of two witnesses.

OTTO G. RIESKE.

Witnesses:
A. S. Bow,
J. Rothwell.